United States Patent
Hedrick et al.

(10) Patent No.: US 6,874,470 B2
(45) Date of Patent: Apr. 5, 2005

(54) POWERED DEFAULT POSITION FOR MOTORIZED THROTTLE

(75) Inventors: Jeffrey R. Hedrick, Tecumseh, MI (US); Ross Dykstra Pursifull, Dearborn, MI (US); Chang Yang, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 53 days.

(21) Appl. No.: 10/379,492

(22) Filed: Mar. 4, 2003

(65) Prior Publication Data

US 2004/0173182 A1 Sep. 9, 2004

(51) Int. Cl.[7] .................................................. F02D 1/00
(52) U.S. Cl. ...................................... 123/396; 123/399
(58) Field of Search ................................ 123/396, 399, 123/361, 337, 198 D; 73/118.1, 118.2

(56) References Cited

U.S. PATENT DOCUMENTS

| | | |
|---|---|---|
| 3,704,635 A | 12/1972 | Eshelman |
| 3,760,786 A | 9/1973 | Marsh |
| 4,612,615 A | 9/1986 | Murakami |
| 4,854,283 A | 8/1989 | Kiyono et al. |
| 5,016,588 A | 5/1991 | Pagdin et al. |
| 5,050,552 A | 9/1991 | Riehemann |
| 5,074,267 A | 12/1991 | Ironside et al. |
| 5,193,506 A | 3/1993 | Ironside et al. |
| 5,255,653 A | 10/1993 | Ironside et al. |
| 5,263,448 A | 11/1993 | Bluhm et al. |
| 5,303,581 A | 4/1994 | McQueen |
| 5,429,090 A * | 7/1995 | Kotchi et al. ............... 123/396 |
| RE35,250 E | 5/1996 | McQueen |
| 5,629,852 A | 5/1997 | Yokoyama et al. |
| 5,950,597 A | 9/1999 | Kamio et al. |
| 5,983,860 A | 11/1999 | Kitamura et al. |
| 6,199,535 B1 | 3/2001 | Hara |
| 6,209,518 B1 | 4/2001 | Machida et al. |
| 6,240,899 B1 | 6/2001 | Yamada et al. |
| 6,276,331 B1 | 8/2001 | Machida et al. |
| 6,318,337 B1 | 11/2001 | Pursifull |
| 6,347,613 B1 * | 2/2002 | Rauch ........................ 123/337 |
| 6,352,064 B1 | 3/2002 | Tomita et al. |
| 6,397,816 B1 | 6/2002 | Pursifull |
| 6,510,839 B1 | 1/2003 | Pursifull |
| 6,523,522 B1 * | 2/2003 | Costin ....................... 123/399 |
| 6,543,415 B1 * | 4/2003 | Pursifull et al. ............ 123/396 |
| 6,588,260 B1 * | 7/2003 | Pursifull ..................... 73/118.1 |
| 6,640,776 B2 * | 11/2003 | Torii .......................... 123/396 |
| 6,711,492 B1 * | 3/2004 | Pursifull et al. ............ 701/114 |
| 2001/0000868 A1 | 5/2001 | Wayama et al. |
| 2001/0035157 A1 | 11/2001 | Wayama et al. |
| 2002/0033166 A1 | 3/2002 | Shimura et al. |
| 2002/0084433 A1 | 7/2002 | Rauch et al. |
| 2004/0060541 A1 * | 4/2004 | Soshino et al. ............. 123/399 |

FOREIGN PATENT DOCUMENTS

| JP | 106369 | * 4/2002 | ............ F02D/9/02 |
|---|---|---|---|

* cited by examiner

*Primary Examiner*—Hai Huynh
(74) *Attorney, Agent, or Firm*—Brinks Hofer Gilson & Lione

(57) ABSTRACT

A method to control the position of a throttle valve in the presence of a fault. The method works independently of throttle position in an open-loop mode. The method assures that the throttle plate will assume the default position if: 1) the return spring is functional and the motor is functional; 2) the return spring has failed but the motor is functional; or 3) if the return spring is functional but the motor has failed. This method does not need to detect loss of return spring functionality and it does not need to detect loss of motor functionality. The detected fault that initiates the action need not be related to either the return spring or the motor.

18 Claims, 4 Drawing Sheets

SPRING TORQUE VERSUS THROTTLE POSITION

POWERED DEFAULT POSITION FOR MOTORIZED THROTTLE

FIELD OF THE INVENTION

The present invention relates to electronically controlled, motorized throttles for vehicle engines. In particular, the present invention relates to the powered return of a throttle to a default position.

BACKGROUND OF THE INVENTION

Internal combustion engines used in automobiles typically operate on fuel-air mixtures, where a fuel injector supplies fuel and a throttle supplies air. On-board computers, programmed to be responsive to a signal from an accelerator in the automobile, determine the amounts of fuel and air. When a driver wishes to move at a higher speed, he or she depresses the accelerator, signaling the computer to supply more fuel, and more air to the engine. The fuel injectors respond by supplying more fuel and the throttle valve responds by opening wider to admit more air to the cylinders of the engine. When the driver wishes to slow down, the driver lifts his or her foot from the accelerator, signaling the fuel injectors to supply less fuel and the throttle to move to a more closed position.

In most internal combustion vehicle engines, an engine throttle valve is utilized to control the idle speed of the engine. The throttle valve is typically a metal plate that is positioned on a rotatable shaft within the mounting flange or venturi of a carburetor. The metal plate is rotatable to control the amount of air-fuel mixture reaching the cylinders of an internal combustion engine. In many prior art vehicles, the rotational position of the throttle plate may be controlled by a linkage connected to the accelerator pedal of the vehicle. The throttle plate may be positioned in a variety of positions, typically within the range of a wide-open, partially open and closed positions.

In more modern throttles, an electric motor is utilized to turn the throttle plate based on signals from an engine controller, such as an electronic control module (PCM). Various inputs into the PCM, such as the accelerator pedal position and the present position of the throttle, are utilized to calculate the precise amount of adjustment to be made by the motor to the throttle plate to give the engine a desired degree of acceleration. Motorized throttles or so-called "electronic throttles," often integrate with one or more throttle position sensors (TPS) to monitor the movement of the throttle valve. The sensors relay the varying movement of the throttle valve to the PCM.

When the PCM calls for more air, the shaft rotates in one direction to open the valve. When less air is needed, the shaft rotates in the opposite direction to close the valve. If the motor fails, the air valve or throttle must move to a "default" condition to maintain some level of engine function. A return spring wound onto the shaft during assembly of the throttle typically enables automatic closing of the throttle. When the shaft rotates to admit more air, it winds the spring into a state of torsion, in which the force or bias of the spring opposes the rotation of the shaft in that direction. If the motor fails, the spring biases the shaft in the opposite direction, safely closing the valve.

Due to the dependence on the throttle return spring, should the return spring ever break or become disabled and such failure is not detected, this important default feature would not be available. In order to prevent this condition, a more reliable apparatus for returning the throttle to the default position in cases where the spring is operational or not operational is desired.

BRIEF SUMMARY OF THE INVENTION

The present invention provides a method and system for powering a motorized throttle to a default position independent of the position of the throttle upon the detection of a fault that prevents reliable closed loop throttle positioning. In the preferred embodiments herein, commands are sent to the powered throttle driving means in an open-loop control algorithm, thus allowing the throttle to be positioned independently of the actual throttle position. In this way, minimum functionality is ensured because the throttle can be repositioned to default even if the secondary driving means (such as a torsion spring) fails.

The present embodiments of the invention have the advantage of providing safety and redundancy in throttle default positioning. The system incorporates an open-loop control algorithm that initiates independent, predetermined throttle movement. The method assures that the throttle plate will assume the default position if: 1) the return spring is functional and the motor is functional, or 2) if the return spring has failed but the motor is functional, or 3) if the return spring is functional but the motor has failed. This method does not need to detect loss of return spring functionality and it does not need to detect loss of motor functionality. The detected fault that initiates the action need not be related to either the return spring or the motor.

In one aspect of the present invention, a method of controlling the position of a valve having an electrical motor providing a torque and another torque producing element tending to return the valve to a default position is provided. This secondary torque producing element may comprise a return spring or other mechanism. The method includes the steps of detecting a throttle fault requiring throttle movement to a default valve position and applying a motor torque profile such that the valve position attained is default whether or not the return spring is providing a return torque.

In another aspect of the present invention, a method of controlling the position of a throttle is provided. The method is performed using a throttle having a driving motor, and includes the steps of detecting a throttle fault condition requiring movement of the throttle toward a default position and returning the throttle to the default position without considering throttle position. The movement is accomplished by applying a first voltage to the motor sufficient to accelerate the throttle toward a default position. A second voltage is then applied to the motor to hold the throttle at the default position, again independently of the throttle position sensor output.

In yet another aspect of the invention, a system is provided for ensuring the return of the throttle to a default position. The system comprises a first driving means linked to the throttle for moving the throttle toward an open position and toward a closed position. A secondary driving means is linked to the throttle and is capable of moving the throttle toward a default position. Signal generation means in communication with the first driving means for signaling the first driving means to position the throttle to the default position independent of the position of the throttle, and detection means is in communication with the signal generation means. The detection means detects a fault relating to the vehicle requiring movement of the throttle to the default position when the throttle is in a first open position.

Other objects, features and advantages of the present invention will become more apparent from the following detailed description made with reference to the accompanying drawings.

DETAILED DESCRIPTION OF THE PREFERRED EMBODIMENTS OF THE INVENTION

The present invention provides a redundant system to supplement implemented default mechanisms in a motorized throttle. The default allows an operation mode such that should the motor ever become unpowered, the vehicle retains some level of functionality. The purpose of the present system and method is to ensure sufficient default positioning of the throttle valve plate if there is failure of a conventional closing device such as a torsion spring assembly. The command to close the valve plate may come from an onboard computer or other source, such as an analog or digital controller, as described in more detail below.

In an internal combustion engine, it is preferred, and mandated by the Federal Motor Vehicle Safety Standards (FMVSS), for throttles to fail in a safe or default condition, eliminating any possibility of runaway engines. For this reason, electronic or motorized throttles (with a motor acting as a first drive means) are equipped with torsion spring assemblies as a secondary drive means for the throttle. If no other force acts upon the shaft that actuates the throttle during a fault situation or other malfunction, the opposing torsion of the spring(s) will urge the throttle toward a default position.

To accomplish closing in a typical system, a spring is wound around the shaft, preloading the spring with an amount of torsion in a direction opposed to the motion that opens the valve. When the throttle is actuated, a voltage is applied to the drive motor, which causes the valve to open and the shaft to rotate as more torsional force is placed on the spring. When the drive motor is powered down by removing voltage from the motor, or if there is a malfunction in the motor, the spring biases the valve to a substantially closed, or "default," position.

Figure 1:
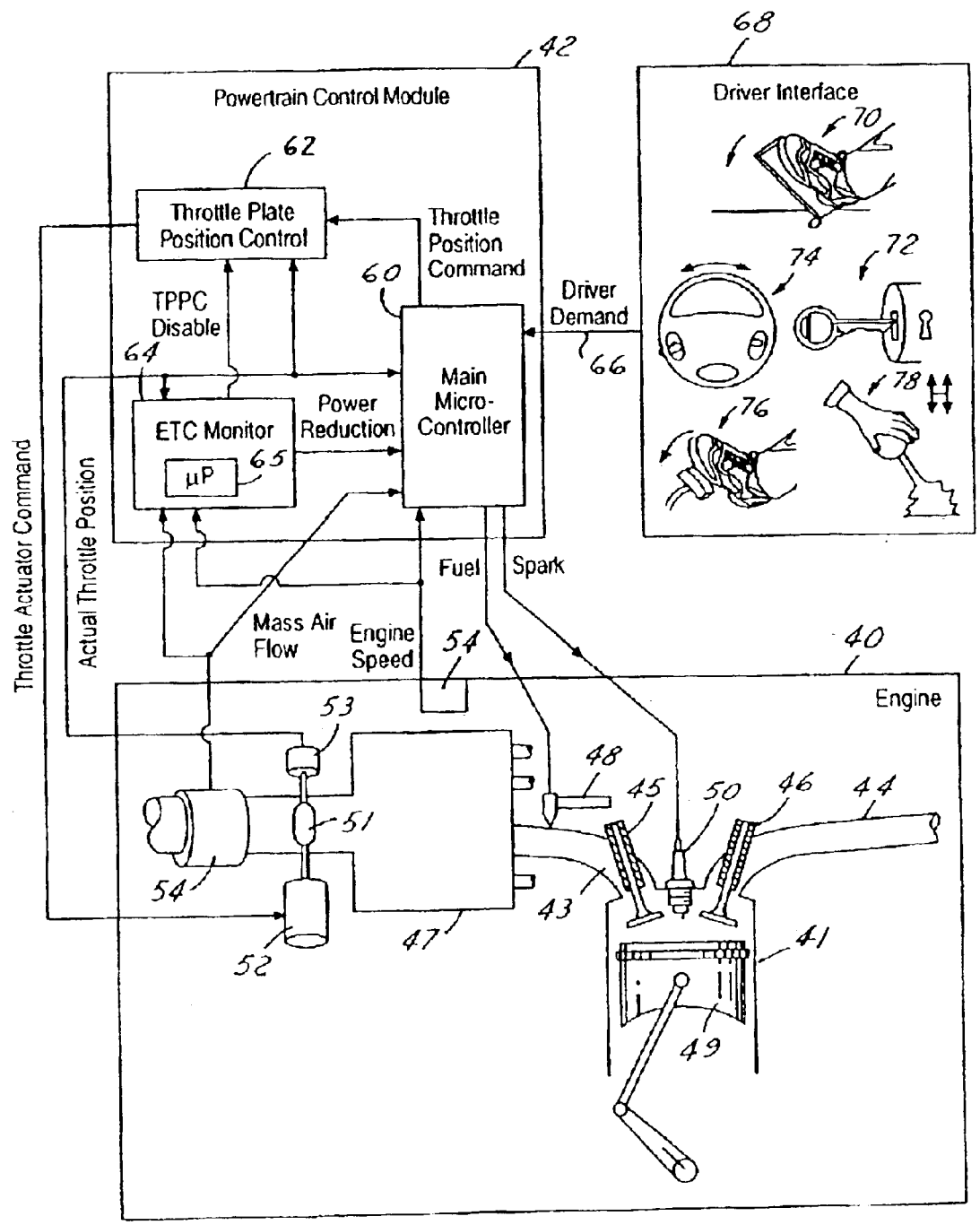
FIG. 1 is a schematic diagram of an exemplary internal combustion engine and associated electronic throttle control and operator input systems as may be utilized in a preferred embodiment of the invention.

Referring now to FIG. 1, there is shown a schematic diagram of an internal combustion engine 40 and associated Powertrain Control Module (PCM) 42 as well as an operator interface 68 in accordance with one embodiment of the present invention. The systems shown herein may be of the type in the prior art, such as the system described in U.S. Pat. No. 6,397,816, the entirety of which is incorporated by reference. The engine 40 includes a plurality of combustion chambers 41 each having an associated intake 43 and exhaust 44 operated by a respective intake and exhaust valves 45, 46. Combustion occurs as a result of the intake of air and fuel from the intake manifold 47 and fuel injector 48 respectively, compressioned by the piston 49, and ignitioned by the spark plug 50. Combustion gases travel through the exhaust manifold 44 to the downstream catalytic converter (not shown) and are emitted out of the tailpipe. A portion of the exhaust gases may also be recirculated back through the intake manifold 47 to the engine cylinders 41.

The airflow through the intake manifold 47 is controlled by an electronic throttle control assembly 10 that will be described in more detail below. Preferably, the assembly 10 comprises at least a throttle plate 51 and throttle actuator 52. The throttle actuator is preferably an electronic servo motor that acts as a primary throttle drive means. A throttle position sensor 53 measures the actual throttle position. The throttle position sensor is typically an analog sensor. Its output may be discretized when it passes through an analog-to-digital converter such that the controller receives discrete positional values for the detected throttle position. Thus, the quandization of the positioning mechanism is typically a function of the resolution of the A to D converter. However, higher resolution typically is associated with higher cost A to D converters. Other output processing methodologies may be utilized.

Other sensors include a mass airflow sensor 54, which measures the amount of air flowing into the engine 40. An engine speed sensor 55 provides a value indicative of the rotational speed of the engine 40.

The PCM 42 receives as inputs the discretized throttle position signal, the mass airflow signal, the engine speed signal, and any driver demand inputs, among other information. In response, the PCM 42 controls the spark timing of the spark plugs 50, the pulse width and timing of the fuel injectors 48, and the position of throttle 51 by way of the throttle actuator 52. These inputs and outputs are controlled by the main micro-controller 60. The main micro-controller 60 controls the throttle position by outputting a throttle position command to the Throttle Plate Position Controller (TPPC) 62 to drive the throttle actuator 52 to the desired position, as will be described in more detail below.

The TPPC 62 is preferably a PID controller that normally controls the throttle position using a closed-loop algorithm based primarily on an error term representing the difference between the desired and actual throttle position values. The desired throttle position can be generated by any known methods of interpreting driver demand and arbitrating it with the various vehicle system constraints such as speed control and traction control. The resulting desired intake airflow value is then factored into a formula to yield a desired throttle position command.

With regard to typical throttle control in this system, the PCM 42 generates a throttle position command. The desired throttle position command is communicated to the TPPC 62. The TPPC 62 preferably conditions the throttle position command and communicates this signal to the closed-loop controller which is part of the TPPC 62. The closed-loop controller outputs a drive signal to the throttle actuator 52 to drive the throttle 51 to the desired position.

The PCM 42 preferably includes an Electronic Throttle Control (ETC) monitor 64 that communicates with the main micro-controller 60 and TPPC 62. The ETC monitor 64 includes a microprocessor 65 and associated memory separate from the microprocessor and the main micro-controller 60. The ETC monitor 64 receives as input the engine speed signal from the engine speed sensor 55 and throttle position signal from the throttle position sensor 53. The ETC monitor 64 then functions to monitor the throttle actuation. Although the ETC monitor 64 and TPPC 62 are shown as separate from the PCM main microprocessor, they could be partially or wholly integrated into the main microprocessor as well. Alternatively, the ETC monitor 64 and TPPC 62 can be integrated into a single controller separate from the main micro-controller 60.

The PCM 42 also receives as inputs driver demand signals 66. The driver demand signals can include such things as accelerator pedal position 70, ignition switch position 72, steering input 74, brake sensor input 76, transmission position input 78, as well as inputs from the vehicle speed control and transmission.

Figure 2:
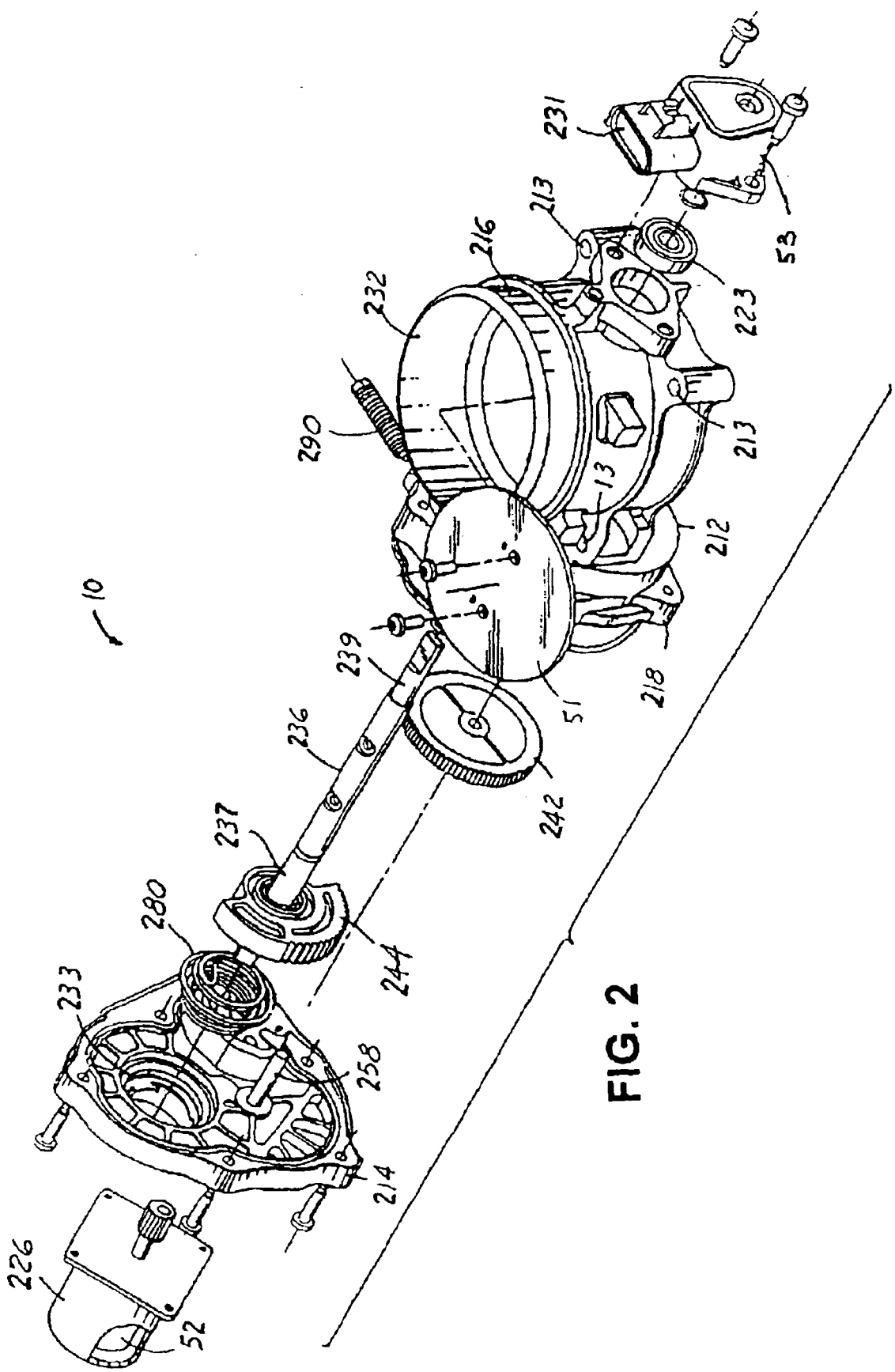
FIG. 2 is an exploded side sectional view of an electronic throttle control mechanism that may be utilized with the present invention showing many of the components thereof.

FIG. 2 is a perspective view of an exemplary electronic throttle control assembly or mechanism which is referred to generally by the reference numeral 10 in this Figure. The structures shown and described are further described in detail in the co-pending application Ser. No. 09/750,892 filed Dec. 28, 2000, the entirety of which is incorporated herein. The electronic throttle control assembly 10 (also known as an electronic throttle body) includes a housing or body member 212 and a cover member 214. The housing 212 includes a throttle valve section 216, a gear train section 218, and a throttle position sensor mechanism 53. The cover member includes a motor housing 226 and an electrical connector member. It is not necessary that any particular arrangement be used for this drive train. Any suitable mechanism that can control the position and turning of a shaft and valve will suffice.

The throttle valve section 216 includes an air flow passageways 32 in which a valve plate 51 is positioned to regulate the flow of air therethrough. The throttle plate 51 is attached to a throttle shaft 236 which is positioned transversely to the axis of the airflow passageway 232. The throttle shaft is positioned in the housing 212 in any conventional manner and preferably is supported by a pair of bearings 223 which allow it to turn freely to regulate the airflow to the engine.

A gear train or mechanism 240 is positioned in the gear train section 218 of the housing member 212. The gear train 240 generally consists of an intermediate or idler gear member 242 and a sector gear member 244. The sector gear 244 is fixedly attached to the upper end 237 of the throttle shaft 236 such that the throttle shaft and throttle plate rotate along with the sector gear.

A motor or actuator 52 is positioned in the motor housing 226 and attached to the cover member 214. The motor 52 is preferably a reversible 13-volt DC motor and is connected to a mounting plate 251 which is secured to the cover member 214 by a plurality of fasteners 249.

A helical torsion spring member 280 is positioned in the gear train section 218 of the housing member 212. The spring member 280 has one end 282 which is fixedly secured to the cover member 214 while the other end 284 of the spring member is positioned in the opening 286 in the sector gear 244. The spring member 280 is positioned around the end 237 of the throttle shaft and between the sector gear 244 and the cover member 214.

Figure 3:
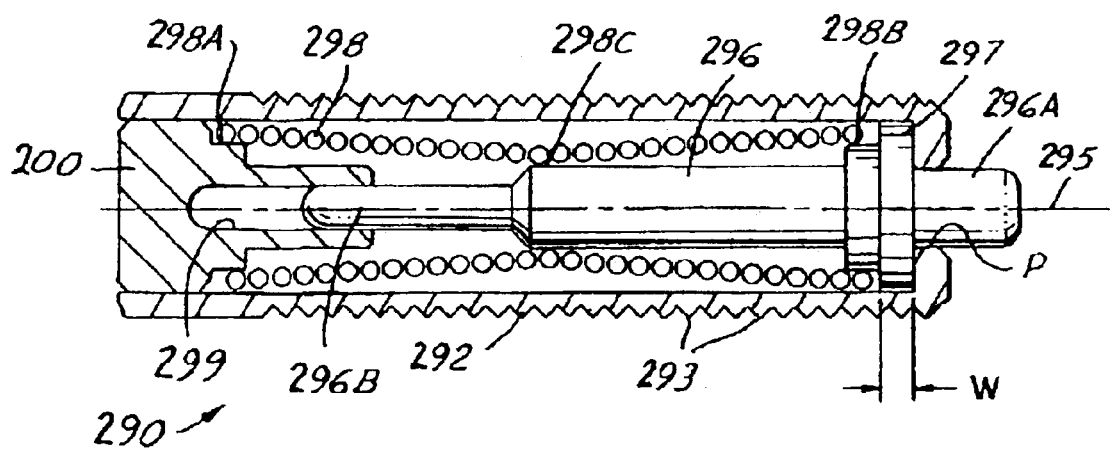
FIG. 3 illustrates a spring-biased plunger member of FIG. 3 which can be utilized with the present invention in conjunction with the return spring.

The spring-biased plunger mechanism which is preferably utilized with the present invention is shown in FIG. 3 and identified generally by the reference numeral 290. The plunger mechanism 290 has an elongated hollow body or housing 92 which is externally threaded to mate with threaded opening 294 in the gear train section 218 of the housing 212. A slideable plunger member 296 is positioned inside the body of the plunger mechanism 290 and is biased by a coil spring member 298 positioned inside the housing 292. A cap or plug member 200 holds the spring member and plunger member 296 in position. Threads 293 on the outer surface of the body 292 of the plunger mechanism 290 mate with corresponding threads in opening 294 in housing 212 so that the plunger mechanism can be adjusted to facilitate proper and optimum positioning and operation of the throttle valve and failsafe mechanism.

The spring-biased plunger mechanism 290, in combination with sector gear 244 and spring member 280, act together as a secondary drive means to limit and control the operation of the valve plate 51 in the failsafe or default mechanism. In this regard, the general operation of the gear assembly, sector gear, plunger member, and the other components are further described in detail in U.S. Pat. No. 6,173,939, the entirety of which is hereby incorporated by reference herein.

Due to the bias of spring member 280 on the sector gear 244 and thus valve plate member 234, the spring member 280 acts to return the throttle plate 234 to or toward the closed position in the event of an electronic failure of the electronic throttle control mechanism 10 or the vehicle itself. In this regard, the throttle plate member 234 and sector gear 244 can be rotated by the motor 250 and gear train mechanism 240 to the fully open position of the throttle plate 51. In the open position, the throttle plate member 51 is positioned approximately parallel to the axis of the air flow passageway 232 thus allowing a full complement of air to pass into the engine. Stop member 219 in the housing 218 limits the throttle valve from opening past the fully open position.

The plunger mechanism 290 acts as a failsafe or default mechanism which prevents the throttle valve from closing completely in the event of an electronic failure. The plunger mechanisms act to position the throttle valve plate 51 in a slightly open position, thus allowing the vehicle to operate at a reduced speed and "limp-home." In this regard, since throttle plate assemblies in engines known today have a slight inclination on the order of 7°–10° in the fully closed position, the default or "limp-home" position of the throttle plate in these engines is about 12°–20° from a position transverse to the axis of the airflow passageway.

Figure 4:
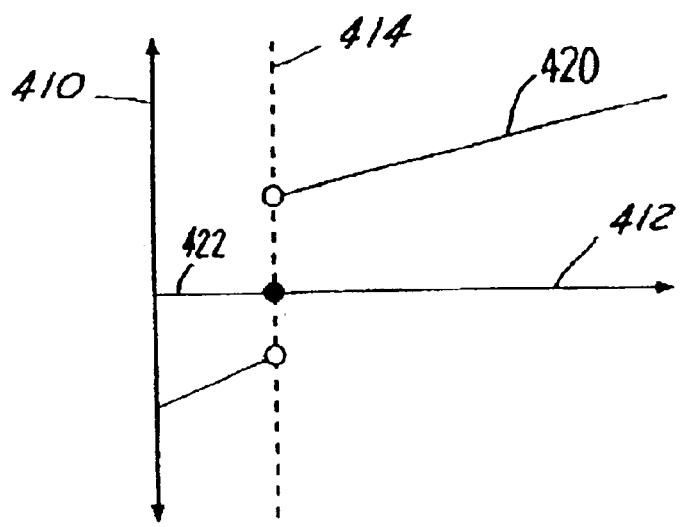
FIG. 4 is a graph illustrating the relationship between a spring torque and a throttle position for an exemplary electronic throttle feedback controller.

FIG. 4 illustrates the relationship between spring torque and the throttle position in the implementation as typically exhibited by the exemplary embodiment of the present invention. The vertical axis 410 indicates the output of motor voltage, or positioning effort, in volts. The horizontal axis 412 shows the input of throttle command in degrees.

The feedforward term for the exemplary spring 280 is determined by the position of the throttle plate in relation to the default position 414. When the throttle plate command is coincident with the default position 414, the feedforward term is zero. When the throttle plate position is greater than the default position 414, the feedforward term is based on the adapted value shown by the line 420, which shows the effort required by the return spring 280 alone to return the throttle to default. However, a person skilled in the art would understand that both the offset and slope may be adapted. Although adapting both the offset and slope may increase performance, the system may become more complex. When the throttle plate command is less than the default position 414, the feedforward term of the plunger 290 in opposition and combination with the spring 280 is shown by the combined force profile shown at 422. Thus, as the throttle surpasses the default position at 414, the plunger 290 applies a reverse force, overtaking the effort of the spring 280 to ensure proper default positioning.

Figure 5:
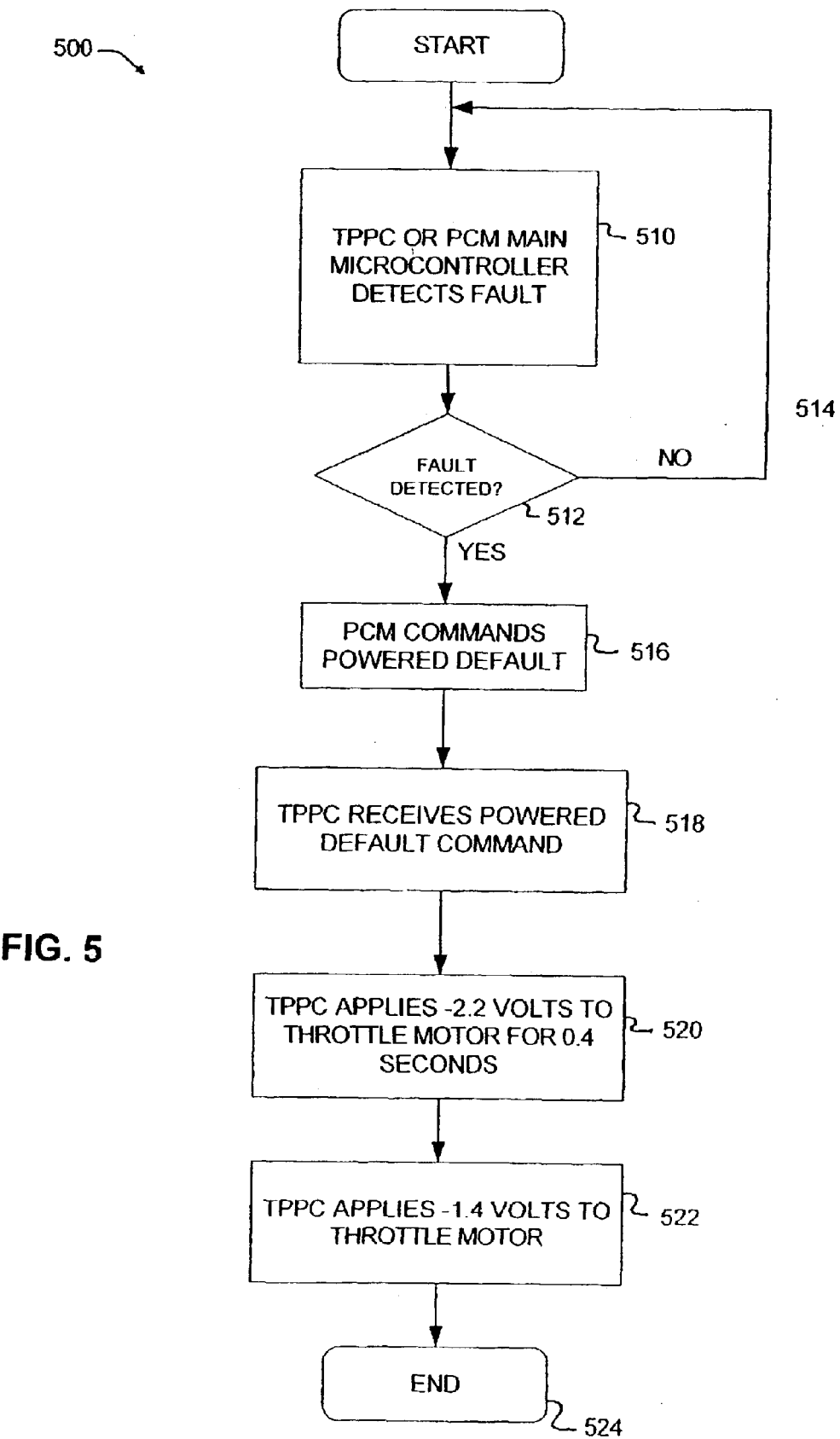
FIG. 5 is a flow diagram illustrating a method of the present invention.

As noted above, there are certain vehicular conditions or faults where the throttle plate 51 must be allowed to return to the default position described above. For example, the ETC 64 may fail its self-test routine, there may be a failure of various throttle commands sent by the ETC 64, there may be an obstruction sensed within the throttle opening, or there may be a miswiring or other mechanism malfunctions. Typically, as noted above, this is accomplished by removing power from the motor and allowing the secondary drive means to return the throttle plate 51 to the default closed position. In the event the secondary drive means becomes disabled, and such malfunction cannot be detected by any of the vehicle systems, the present embodiment of the invention will reliably return the throttle to the default position regardless of the secondary drive means malfunction. This is accomplished by implementing an open-loop control feature wherein the throttle actuator 52 is used to drive the throttle plate 51 to a default position instead of the spring 280 and plunger 292 alone. Thus, the throttle is driven to a default position using both the first driving means (the motor 52) and the secondary driving means. In this way, even if the secondary driving means has failed and its failure is undetected, the throttle still safely returns to the default position. Turning to FIG. 5 in conjunction with FIGS. 1–3, a flow diagram showing exemplary steps of a computer algorithm 500 for controlling the throttle is provided. By implementing these steps on the micro controller 60, or in the TPPC 62 or ETC 65, the throttle default closing can be ensured. This default control program may reside in a memory of the microcontroller 60 of the PCM 42 or ETC 64 or TPPC 62, or in various other linked electronic storage areas of the vehicle. As shown in the Figure, the routine is triggered upon the detection by the TPPC 62 or the PCM main controller 60 of a system malfunction or fault at Box 510. These malfunctions can include, for example, the following situations: 1) the TPPC 62 fails its self-test routine; 2) any failure of a throttle position issued command from the TPPC 62; 3) a sensed obstruction in the throttle opening; 4) a failure in the H-bridge; 5) a detected miswiring or other electronic malfunction; 6) failure in the motor circuit; and 7) the throttle position sensors being out of proper sensing range. Of course, a variety of other situations can cause malfunctions that require return to the default position.

During these periodic checks, if a fault is not detected, the routine at Box 512 continues its detection function via the loop 514. If a fault is detected at 512, the PCM 42 may then command a powered default 516. The PCM 42 sends a signal from the micro controller 60 to the TPPC 62 at Box 516, and the TPPC 62 receives the powered default command at Box 518. At this open-loop stage, the TPPC 62 generates a signal or voltage in accordance with a predetermined motor torque profile to cause the throttle motor 52 to accelerate the throttle plate 51 to a default position. Typically, this may be accomplished by applying a negative voltage of, for example, −2.2 volts to the throttle motor for 0.4 seconds. The voltage is sufficient to accelerate the throttle towards the default position quickly, and allows the repositioning to take place independent of the throttle position sensor's information normally fed back to the Throttle Plate Position Controller (TPPC).

After such application, a further negative voltage may be applied at box 22, as the TPPC 62 sends another signal to the motor 52 to ensure complete default positioning of the throttle plate and reduce the acceleration. The voltage also holds the throttle in the proper default position. It is important to ensure that this voltage is chosen so that the reverse force of the default plunger 290 is not overcome. This is typically accomplished by the TPPC 62 applying a backed-off voltage of −1.4 volts to the throttle motor 52. These voltage and other values may vary depending on variables such as type and capacity of motor, throat size and size of throttle plates. Furthermore, currents may be applied to the motor 52 or in combination with the various voltages to provide the predetermined default motor torque.

As noted above, the procedure steps 520 and 522 are open-loop control algorithms, in that they perform these voltage applications to the throttle motor 52 independent of any data from the throttle sensor 53 or any data indicative of the throttle position. This open-loop control simplifies the system tremendously, and ensures that throttle closing may be accomplished in the event of a wide range of possible faults or other malfunctions.

In additional to throttles, the advantages of the invention may be realized on any valve, especially those in which the sealing element or valve element is on a shaft, such as a valve plate, but also ball valves, gate valves, globe valves, and plug cocks.

The preferred embodiment of the invention is implemented with a motorized throttle in which a motor supplies the desired motion of the throttle in use, but other embodiments may use other actuators, such as pneumatic cylinders or hydraulic cylinders. While gears may provide the interface between the valve element and the moving force, other means besides gears may be used, such as levers, screws, pulleys, or other mechanical means suitable to actuating a valve element.

The present embodiments of the invention have the advantage of providing safety and redundancy in throttle default positioning without the added complexity of throttle position sensors or feedback control. The system incorporates an open-loop control algorithm that initiates independent, predetermined throttle movement. The method assures that the throttle plate will assume the default position if: 1) the return spring is functional and the motor is functional; 2) the return spring has failed but the motor is functional; or 3) if the return spring is functional but the motor has failed. This method does not need to detect loss of return spring functionality and it does not need to detect loss of motor functionality. The detected fault that initiates the action need not be related to either the return spring or the motor.

It is therefore intended that the foregoing description illustrates rather than limits this invention, and that it is the following claims, including all equivalents, which define this invention. Of course, it should be understood that a wide range of changes and modifications may be made to the embodiments and preferences described above. Accordingly, it is the intention of the applicants to protect all variations and modifications within the valid scope of the present invention. It is intended that the invention be defined by the following claims, including all of the equivalents thereto.

What is claimed is:

1. A method of controlling the position of a valve having a first torque producing element comprising electrical motor providing a torque and a second torque producing element providing a return torque tending to return the valve to a default position, said method comprising the steps of:

detecting a throttle fault requiring throttle movement to a default valve position; and applying a predetermined motor torque profile to move said throttle toward said default position whether or not said second torque producing element is providing a return torque.

2. The method of claim 1 wherein said second torque producing element further comprises a spring.

3. The method of claim 1 wherein the motor torque is produced by applying a voltage.

4. The method of claim 1 wherein the motor torque is produced by applying a current.

5. The method of claim 1 wherein the motor torque profile is the one resulting from applying an accelerating voltage for a period and then applying a holding voltage.

6. A method of controlling the position of a throttle having a driving motor, said method comprising the steps of:
   detecting a throttle fault condition requiring movement of the throttle to a default position;
   returning said throttle to said default position without considering throttle position by applying a first voltage to said motor sufficient to accelerate said throttle toward a default position; and
   applying a second voltage to said motor sufficient to hold said throttle to at said default position, said application being made independent of said throttle position.

7. The method of claim 6 wherein said step of detecting a throttle fault condition is performed by the powertrain control module of a vehicle.

8. The method of claim 7 further comprising the step of providing at least one throttle position sensor in communication with said powertrain control module.

9. The method of claim 8 wherein said step of returning said throttle to said first default position further comprises issuing a command from said powertrain control module.

10. The method of claim 9 further comprises providing a throttle position controller in communication with said powertrain control module to receive said command from said powertrain control module.

11. The method of claim 10 wherein said throttle position controller sends commands to said throttle via the application of voltages to said motor.

12. The method of claim 6 wherein said default position further comprises a throttle position that corresponds to an engine idle state.

13. A system for ensuring the return to a default position for a throttle in a vehicle, said system comprising:
    a first driving means linked to said throttle for moving said throttle toward an open position and toward a default position;
    a secondary driving means linked to said throttle capable of moving said throttle toward a default position;
    signal generation means in communication with said first driving means for signaling said first driving means to position said throttle to said default position independent of the position of said throttle; and
    detection means in communication with said signal generation means for detecting a fault relating to said vehicle requiring movement of said throttle to said default position when said throttle is in an open position.

14. The system of claim 13 wherein said first driving means further comprises an electric gear motor.

15. The system of claim 14 wherein said secondary driving means further comprises a torsion spring for biasing said throttle toward said default position.

16. The system of claim 15 wherein said signal generation means further comprises a powertrain control module.

17. The system of claim 16 wherein said signal further comprises the application of a voltage to said first driving means.

18. The system of claim 17 wherein said signal generation means is in communication with a powertrain control module for said vehicle.

* * * * *